United States Patent
Yan

(10) Patent No.: US 7,487,987 B2
(45) Date of Patent: Feb. 10, 2009

(54) USER-PROPELLED RIDING TOYS WITH SIMULTANEOUS PEDAL RECOVERY SYSTEM

(75) Inventor: Hui Yan, Marietta, GA (US)

(73) Assignee: Ningbo Landsurf Sports Equipment Co. Ltd., Yuyao (CN)

( * ) Notice: Subject to any disclaimer, the term of this patent is extended or adjusted under 35 U.S.C. 154(b) by 0 days.

(21) Appl. No.: 11/455,981

(22) Filed: Jun. 20, 2006

(65) Prior Publication Data

US 2006/0249925 A1    Nov. 9, 2006

(51) Int. Cl.
B62M 1/02    (2006.01)

(52) U.S. Cl. .................. 280/221; 280/255; 280/282; 280/408

(58) Field of Classification Search .............. 280/220, 280/221, 253, 255, 282, 408
See application file for complete search history.

(56) References Cited

U.S. PATENT DOCUMENTS

| | | | |
|---|---|---|---|
| 322,504 A | 7/1885 | Thompson | |
| 329,584 A | 11/1885 | Miller | |
| 589,920 A * | 9/1897 | Alger | 280/255 |
| 1,014,279 A * | 1/1912 | Auger | 280/221 |
| 1,440,372 A * | 1/1923 | Brown et al. | 280/221 |
| 1,549,088 A * | 8/1925 | Karpiuk | 280/261 |
| 1,632,308 A * | 6/1927 | Mourer | 280/221 |
| 1,640,476 A | 8/1927 | Whitcomb, Jr. | |
| 1,690,342 A * | 11/1928 | Madsen | 280/257 |
| 1,977,035 A * | 10/1934 | Benjamin | 280/221 |
| 3,039,790 A | 6/1962 | Trott | |
| 3,375,023 A | 3/1968 | Cox | |
| 3,415,540 A | 12/1968 | Portnoff | |
| 3,661,404 A | 5/1972 | Bossaer | |
| 3,759,543 A | 9/1973 | Clark | |
| 3,834,733 A | 9/1974 | Harris | |
| 3,877,724 A | 4/1975 | Chase | |
| 3,954,282 A | 5/1976 | Hege | |
| 3,984,129 A | 10/1976 | Hege | |
| 4,019,230 A | 4/1977 | Pollard | |
| 4,053,173 A | 10/1977 | Chase, Sr. | |
| 4,124,222 A | 11/1978 | Moe | |
| 4,152,001 A | 5/1979 | Christianson | |
| 4,300,784 A | 11/1981 | Efros | |
| 4,379,566 A | 4/1983 | Titcomb | |
| 4,411,442 A | 10/1983 | Rills | |
| 4,467,668 A | 8/1984 | Tatch | |

(Continued)

FOREIGN PATENT DOCUMENTS

CH    680723 A5 *    10/1992

(Continued)

OTHER PUBLICATIONS

English translation of CH 680723.*

*Primary Examiner*—Kevin Hurley

(57) ABSTRACT

This invention is a user-propelled riding toy. A platform on which a user stands is supported by at least two wheels; and a geartrain mounts to the wheels. The geartrain is adapted to receive a downward force from the pedals, and translate a portion of the downward force into a rotational force on the wheels. The geartrain also provides an upward return force acting on the pedal. The platform is propelled forward direction by the rotational force on the wheels. When one pedal is pressed down, the other pedal will be raised simultaneously.

25 Claims, 5 Drawing Sheets

U.S. PATENT DOCUMENTS

| | | | |
|---|---|---|---|
| 4,564,206 A | 1/1986 | Lenhardt | |
| 4,574,649 A | 3/1986 | Seol | |
| 4,621,825 A | 11/1986 | Lee | |
| 4,630,839 A | 12/1986 | Seol | |
| 4,645,223 A | 2/1987 | Grossman | |
| 4,828,284 A * | 5/1989 | Sandgren | 280/221 |
| 4,846,488 A | 7/1989 | Szadkowski | |
| 4,861,054 A | 8/1989 | Spital | |
| 4,915,403 A | 4/1990 | Wild | |
| 5,114,166 A | 5/1992 | McCosker | |
| 5,154,436 A | 10/1992 | Jez et al. | |
| 5,192,089 A | 3/1993 | Taylor | |
| 5,224,719 A | 7/1993 | Goodspeed | |
| 5,280,935 A | 1/1994 | Sobocan | |
| 5,294,140 A * | 3/1994 | Rinkewich | 280/221 |
| 5,310,202 A | 5/1994 | Goodspeed | |
| 5,335,927 A | 8/1994 | Islas | |
| 5,351,575 A | 10/1994 | Overby | |
| 5,368,321 A | 11/1994 | Berman et al. | |
| 5,716,069 A | 2/1998 | Bezerra et al. | |
| 5,785,337 A | 7/1998 | Ming | |
| 5,819,865 A | 10/1998 | Cowley | |
| 5,839,737 A | 11/1998 | Kruczek | |
| 5,860,329 A | 1/1999 | Day | |
| 5,984,335 A | 11/1999 | Tseng | |
| 5,988,662 A | 11/1999 | Staehlin | |
| 6,007,074 A | 12/1999 | Tamg | |
| 6,059,303 A | 5/2000 | Bradfield | |
| 6,079,724 A | 6/2000 | Lin | |
| 6,173,981 B1 * | 1/2001 | Coleman | 280/253 |
| 6,220,615 B1 * | 4/2001 | Chubbuck | 280/304.1 |
| 6,352,270 B1 | 3/2002 | Wu | |
| 6,382,043 B1 | 5/2002 | Lin | |
| 6,398,244 B1 | 6/2002 | Chueh | |
| 6,402,173 B1 | 6/2002 | Chiu | |
| 6,572,128 B2 | 6/2003 | Graf | |
| 6,588,784 B1 * | 7/2003 | Chen | 280/221 |
| 6,626,442 B2 | 9/2003 | Pahis | |
| 6,648,353 B1 * | 11/2003 | Cabal | 280/221 |
| 6,648,355 B2 | 11/2003 | Ridenhour | |
| 6,688,624 B2 | 2/2004 | Christensen | |
| 6,716,141 B2 * | 4/2004 | Bhoopathy | 482/51 |
| 6,848,697 B2 | 2/2005 | Lan | |
| 6,857,648 B2 | 2/2005 | Mehmet | |
| 6,991,242 B2 | 1/2006 | Teng | |
| 7,073,805 B2 | 7/2006 | Yan | |
| 2006/0055144 A1 | 3/2006 | Norman | |
| 2006/0066072 A1 | 3/2006 | Scarborough | |
| 2007/0114749 A1 | 5/2007 | Tal | |

FOREIGN PATENT DOCUMENTS

| | | | |
|---|---|---|---|
| GB | 2219261 A | * | 12/1989 |
| GB | 2246986 A | * | 2/1992 |
| WO | WO 8302598 A1 | | 8/1983 |

\* cited by examiner

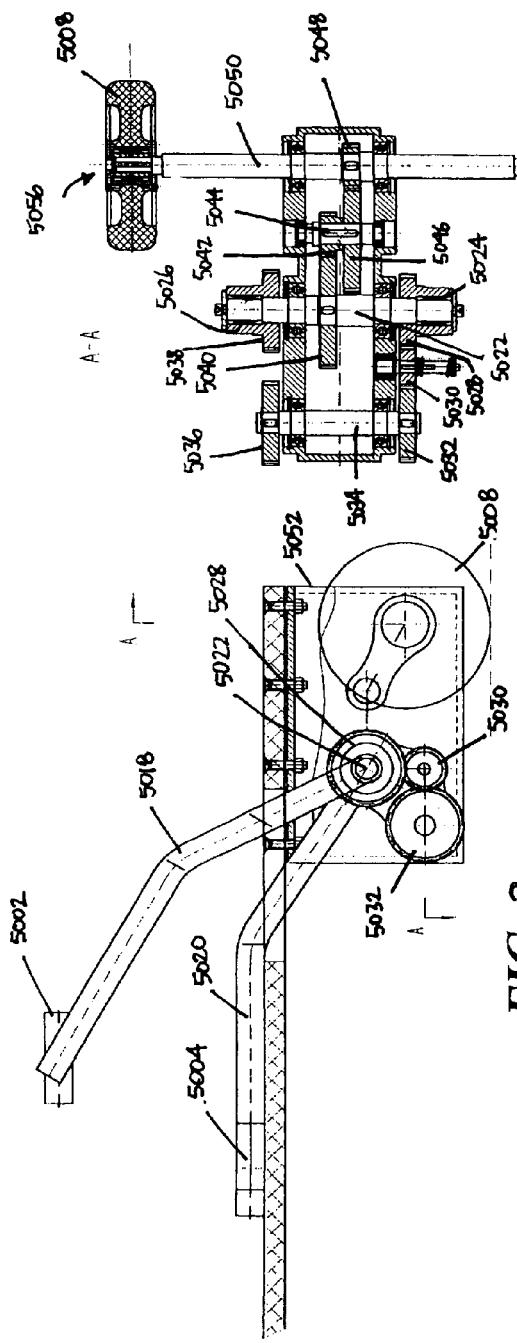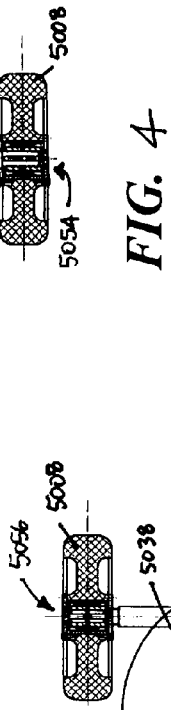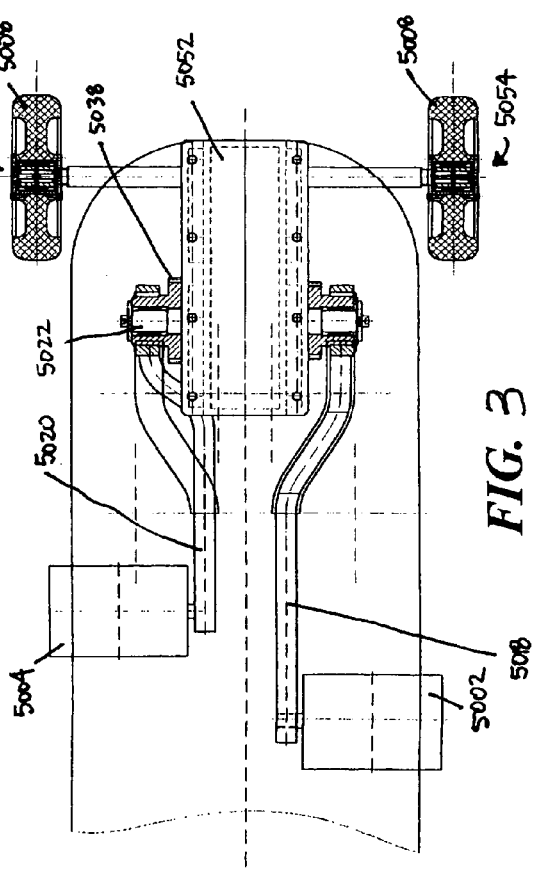
FIG. 2
FIG. 3
FIG. 4

USER-PROPELLED RIDING TOYS WITH SIMULTANEOUS PEDAL RECOVERY SYSTEM

RELATED APPLICATIONS

This application claims priority to U.S. patent application Ser. No. 10/751,370 entitled "User-Propelled Riding Toys And Methods" filed on Jan. 5, 2004, incorporated herein by reference.

FIELD OF THE INVENTION

The invention relates generally to the field of sports, games, recreation, and particularly relates to user-propelled toy vehicles.

BACKGROUND OF THE INVENTION

Conventional toys such as skateboards and scooters require a user to propel the toy forward by using at least one foot along the ground to generate forward motion while keeping the other foot on the toy without touching the ground. Some patents on the pedal scooters either are with one pedal or using two pedals without good pedal return systems.

These toys are inefficient and do not allow the user to attain relatively high speeds and accurate maneuvering. In some cases, the user becomes tired very soon and has to stop to rest. In other cases, the user becomes disinterested and the user stops playing with the toy. Examples of these conventional toys are self-propelled scooters and skateboards. Therefore, a need exists for improved user-propelled riding toys and methods.

SUMMARY OF THE INVENTION

According to the invention, a scooter includes a frame, pedals adapted to support a user, wheels, a steering hand bar, and a geartrain mounted to the wheels. The geartrain is adapted to receive a downward force from the pedals, translate a portion of the downward force into a rotational force acting to rotate the wheels in one direction only, and provide an upward return force for the pedals.

Objects, features, and advantages of various embodiments of the invention include:

(1) Improved apparatuses and methods for propelling a toy, such as a scooter; and
(2) Push down one pedal will simultaneous raise the other pedal.

Other objects, features and advantages of various embodiments according to the invention are apparent from the other parts of this document.

BRIEF DESCRIPTION OF THE DRAWINGS

FIG. 2 is a side sectional view of a transmission assembly for the apparatus shown in FIG. 1.

FIG. 3 is an overhead sectional view of the transmission assembly for the apparatus shown in FIG. 1.

FIG. 4 is a cross sectional view of the transmission assembly for the apparatus shown in FIG. 1.

DETAILED DESCRIPTION OF SPECIFIC EMBODIMENTS

The present invention relates to a user-propelled toy such as a skateboard or scooter, which utilizes power generated by movement of a user supported by a platform while keeping both feet on the platform without touching the ground. While the embodiments shown in the figures relate to skateboards and scooters, one skilled in the art will recognize the applicability of the invention to other toys, vehicles, and/or platforms that can support a user.

Figure 1:
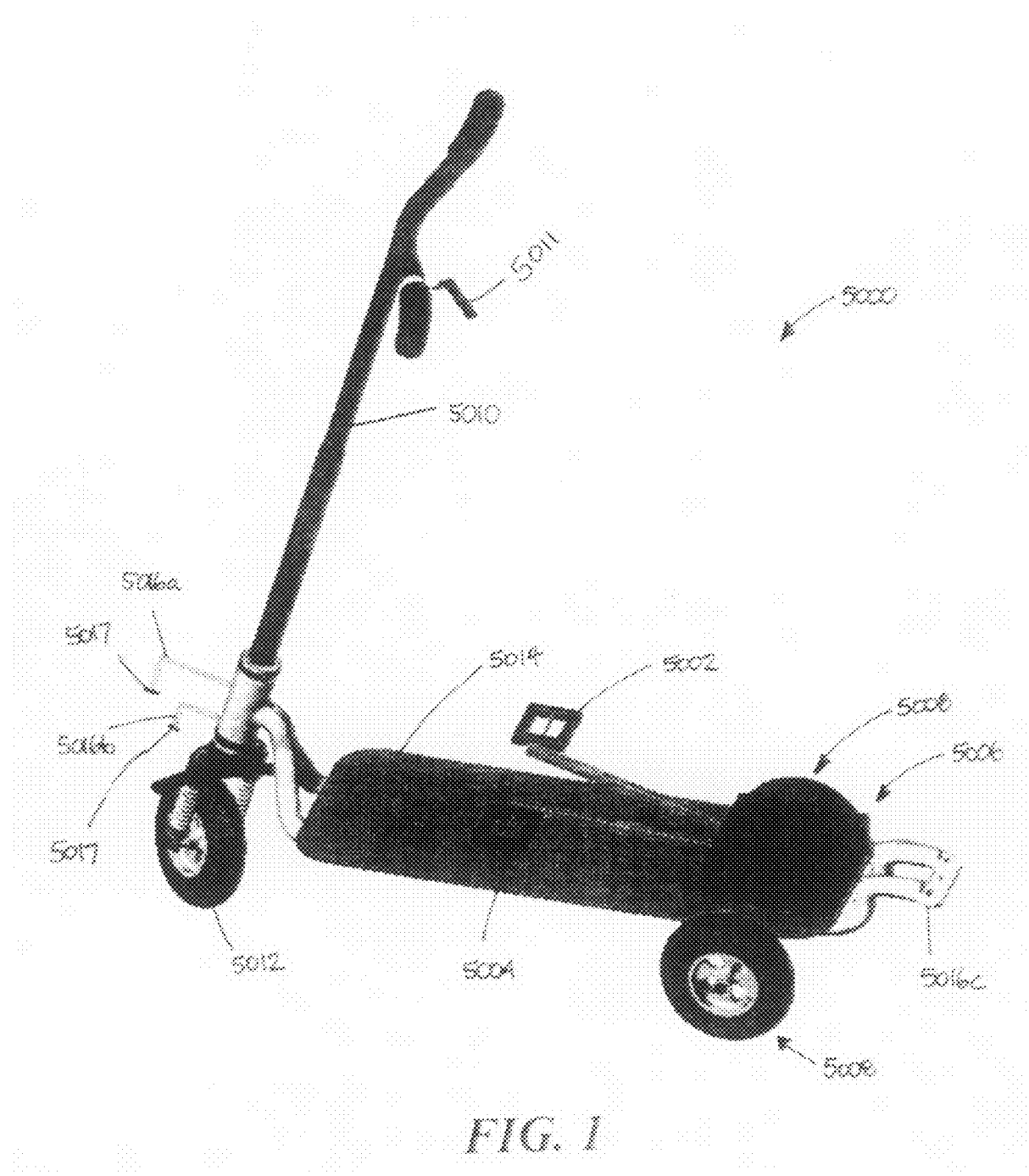
FIG. 1 is a perspective view of a first embodiment of an apparatus in accordance with the invention.

FIG. 1 is a perspective view of a first embodiment of an apparatus in accordance with the invention. The apparatus shown is a scooter 5000 that is propelled by driving two pedals 5002, 5004 upward and downward. Each pedal 5002, 5004 is adapted to receive a portion of a user's body weight when a user's foot is placed on each pedal 5002, 5004. Each pedal 5002, 5004 is also adapted to move between an initial position and a depressed position. The scooter 5000 also includes a geartrain or transmission assembly 5006 oriented towards the rear portion of the scooter 5000 that translates downward force on the pedals 5002, 5004 to a rotational force on a set of wheels 5008. The scooter 5000 further includes a T-shaped steering handle 5010, including brake 5011, which mounts to a front wheel 5012 and a lower frame 5014. Note that the geartrain shown is by example only, and other configurations and devices for propelling a scooter can be utilized in accordance with various embodiments of the invention. A geartrain can include, but is not limited to, chain-type_drives, band-type_drives, hydraulic-type drives, or other gear drives that translate a downward force into a rotational force.

The embodiment shown is also called a "reverse" pedaling scooter. With conventional scooters and pedal-type devices, users operate the conventional devices by facing a drive arm shaft of a geartrain. Users operating the described embodiment experience a different type of pedaling motion than with conventional devices since the drive arm shaft of the geartrain or transmission assembly 5006 shown is positioned behind the user.

Figure 7:
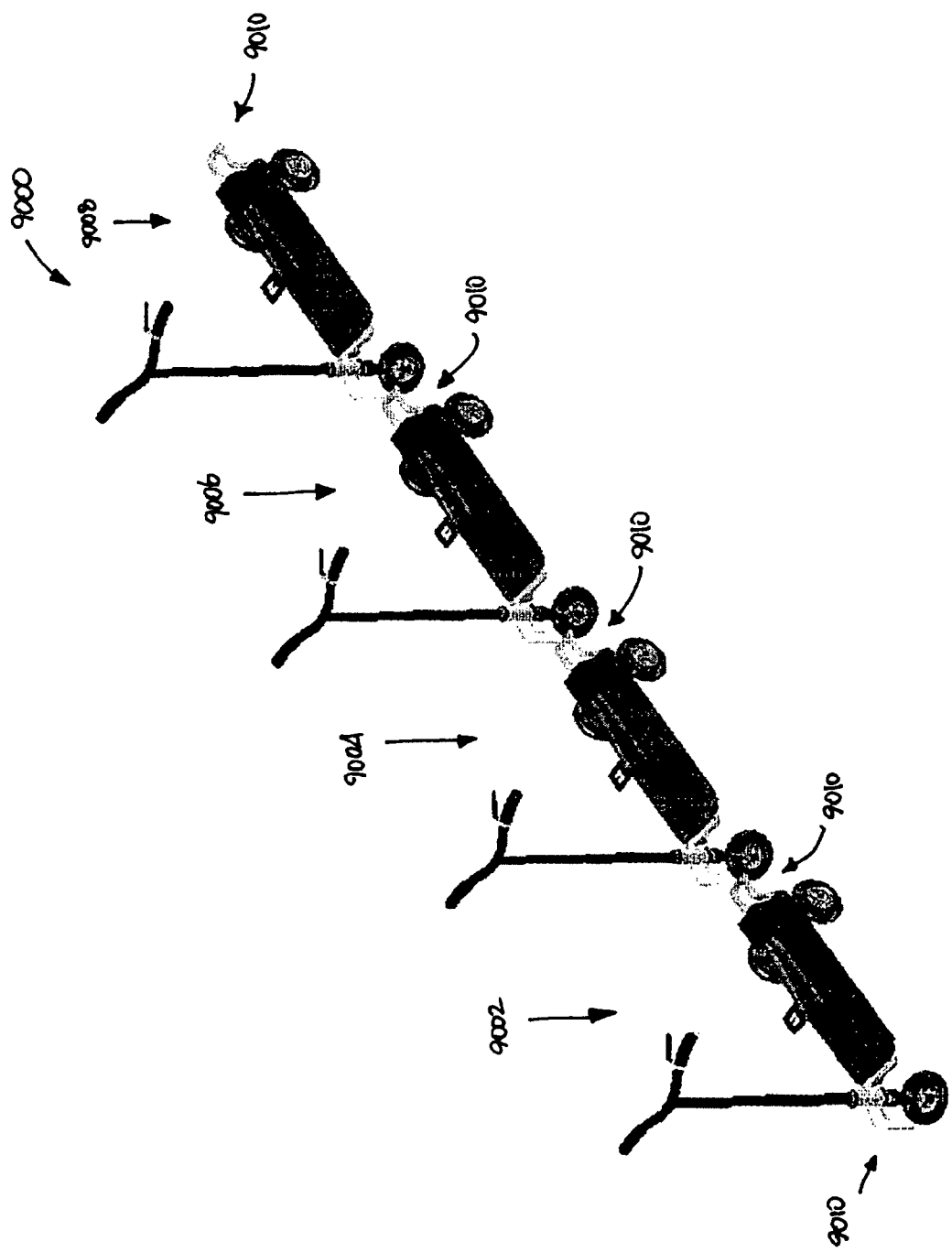
FIG. 7 is a scooter train in accordance with the invention.

The scooter 5000 also includes attachment devices 5016a, 5016b, in the front portion of the scooter 5000, and attachment device 5016c in the rear portion of the scooter 5000. The attachment devices 5016a, 5016b, 5016c are adapted to connect the scooter 5000 to other scooters with corresponding attachment devices 5016a, 5016b, 5016c or similar type devices to form a scooter train as shown in FIG. 7. Attachment device 5016a is a L-shaped hook that mounts to the front portion of the lower frame 5014 or to a sleeve on the handle 5010 with an extended portion of the L-shaped hook facing downward. The L-shaped hook portion includes an adjustable nut 5017 at the end of the portion facing downward. Likewise attachment device 5016b is a relatively smaller L-shaped hook that mounts to the front portion of the lower frame 5014 or to a sleeve on the handle 5010 with an extended portion of the hook facing downward. The L-shaped hook portion also includes an adjustable nut 5017 at the end of the portion facing downward. Corresponding attachment device 5016c is an elongated loop that mounts to the rear portion of the lower frame 5014 and can receive the extended portion of attachment device 5016a or 5016b. Either of the attachment devices 5016a, 5016b can be further secured to attachment device 5016c by mounting the respective attachment devices 5016a, 5016b to the corresponding attachment device 5016c, and then mounting the adjustable nut 5017 to the extended end of attachment device 5016a, 5016b. Adjusting the adjustable nut 5017 limits the insertion of the L-shaped hook portion of an attachment device 5016a, 5016b into a corresponding attachment device 5016c.

When a scooter with attachment device 5016b connects to the rear portion of a scooter with corresponding attachment device 5016c, the front wheel 5012 of the scooter is lifted from the ground and the front portion of the scooter 5000 is supported by the connection between attachment devices 5016b and 5016c. The front scooter will control the steering for both scooters, and both scooters can be propelled by use of the pedals. If a scooter with attachment device 5016a connects to the rear portion of a scooter with corresponding attachment device 5016c, the front wheel 5012 of the scooter touches the ground. The rear scooter can partially control the steering for the connected scooters, while both scooters can be propelled by use of the pedals. In either configuration, multiple scooters with connection devices 5016a, 5016b, 5016c can be connected together to form a "scooter train" as shown in FIG. 7. Other devices or methods to connect scooters together can be used in accordance with the invention.

FIGS. 2-4 illustrate a transmission assembly for the apparatus shown in FIG. 1. FIG. 2 is a side sectional view of a transmission assembly, FIG. 3 is an overhead sectional view of the transmission assembly shown in FIG. 2, and FIG. 4 is a cross sectional view of the transmission assembly shown in FIG. 2. The two pedals 5002, 5004 mount to a respective drive arm 5018, 5020 that also connect to the transmission assembly 5006. The drive arms 5018, 5020 cooperate with the transmission assembly 5006 so that when one pedal 5002 moves in a first downward direction, the other pedal 5004 moves in an opposing, upward direction. This type of action is also known as "drive pedal recovery" or "drive arm recovery." Devices that perform this type of action, such as the combination of shafts, gears, and clutches shown here, are known as "recovery action" devices. The drive arms 5018, 5020 each mount to a first axle 5022 via a respective one-way or overrunning clutch 5024, 5026. When drive arm 5018 is pressed down, a first return gear or first gear 5028 engages a second return gear or second gear 5030, and second return gear 5030 further engages a third return gear or third gear 5032 mounted on a second shaft or second axle 5034. Subsequent rotation of the third return gear 5032 rotates the second shaft 5034 in a first counter-clockwise direction. In turn, second shaft 5034 rotates fourth return gear or fourth gear 5036, and fourth return gear 5036 engages and rotates fifth return gear or fifth gear 5038 in a second clockwise direction. Due to the staggered cross-sectional view of FIG. 4, the fourth return gear 5036 and fifth return gear 5038 are not shown engaging each other. Note also that the first return gear 5028 and third return gear 5032 have the same number of gear teeth, and likewise, the fourth return gear 5036 and fifth return gear 5038 have the same number of gear teeth. The diameter of the third return gear 5032 and the first return gear 5028 is less than that of the fourth return gear 5036 so that the first return gear 5028 and third return gear 5032 do not directly engage, while the fourth return gear 5036 and fifth return gear 5038 are directly engaged. First gear 5028 may additionally be considered a left gear operable with first pedal 5002 and drive arm 5018 and clutch 5024, and fifth gear 5038 may be considered a right gear operable with second pedal 5004 via drive arm 5020 and clutch 5026.

The starting position of drive arms 5018, 5020 can be manually adjusted by repositioning the respective second return gear 5030. When the second return gear 5030 is pulled outward and away from first return gear 5028, the drive arms 5018, 5020 can be vertically raised or lowered with respect to the second return gear 5030. After adjustment of the drive arms 5018, 5020 to a desired starting position, second return gear 5030 is pushed back towards and engaged with the first return gear 5028. In this manner, the vertical positions of the drive arms 5018, 5020 can be adjusted for the convenience, comfort, or fit of a user.

The drive arm or drive pedal recovery action in the transmission assembly 5006 provides a "return" force to each respective drive arm 5018, 5020 when the opposing drive arm 5018, 5020 moves to a depressed position. For example, when drive arm 5018 is initially positioned at a relatively higher starting position and the drive arm 5018 receives a downward force, the drive arm 5018 moves pedal 5002 to a lower, depressed position. The drive arm or drive pedal recovery action moves the opposing drive arm 5020 from an initial lower, depressed position to a relatively higher position where the corresponding pedal 5004 can subsequently receive a downward force from the user. The user forces drive arm 5020 and pedal 5004 downward, and the drive arm or drive pedal recovery action in the transmission assembly 5006 provides a "return" force to drive arm 5018 and pedal 5002 back to the higher starting position.

Downward forces applied to the pedals 5002, 5004 are also transferred to the rear set of wheels 5008 by the transmission assembly 5006. The transmission assembly 5006 includes a first drive gear 5040 mounted to the first shaft 5022, a second drive gear 5042 mounted to a second shaft 5044, a third drive gear 5046 mounted to the second shaft 5044, and a fourth drive gear 5048 mounted to a rear axle 5050.

Note that the shafts 5022, 5044, and axle 5050 are supported by a casing 5052. The set of wheels 5008 mounts to opposing ends of the axle 5050. Conventional bearings for rotation of the shafts 5022, 5044, axle 5050, and set of wheels 5008 are used.

Downward forces transferred from the pedals 5002, 5004 to the overrunning clutches 5024, 5026 are transmitted to the first drive gear 5040 via the first shaft 5022. The first drive gear 5040 transfers the force to the second drive gear 5042. The second drive gear 5042 transfers the force through the second shaft 5044 to the third drive gear 5046. The third drive gear 5046 then transmits the force to the fourth drive gear 5048, and the fourth drive gear 5048 transmits the force to the rear axle 5050. The force on the rear axle 5050 causes the rear set of wheels 5008 mounted to the rear axle 5050 to turn accordingly. Other configurations of gears can be utilized for a transmission assembly in accordance with the invention.

A second one-way clutch or overrunning clutch 5054, 5056 in each wheel of the rear set of wheels 5008 permits the rear set of wheels 5008 to rotate faster than the rear axle 5050. This type of motion is similar to the freewheeling motion described with respect to the embodiments above.

An optional brake (not shown) can be mounted to the set of wheels 5008, and a manual grip (not shown) to apply the brake can be connected to the handle 5010. Those skilled in the art will recognize the type of brake and manual grip that can be utilized in accordance with the invention.

A user operates the scooter 5000 by repetitively and alternatively depressing each pedal 5002, 5004 in a downward direction. The downward forces on the pedals 5002, 5004 are translated by the transmission assembly 5006 into a rotational force on the set of wheels 5008, propelling the scooter 5000 in a forward direction. Directional steering of the scooter can be achieved by turning the handle 5010 and front wheel 5012 in the desired direction of travel. When used in conjunction with other scooters with corresponding attachment devices, the scooter 5000 can be connected via the attachment devices 5016a, 5016b, 5016c to form a scooter train shown in FIG. 7 that can be propelled and steered in a similar manner as described above.

Figure 5:
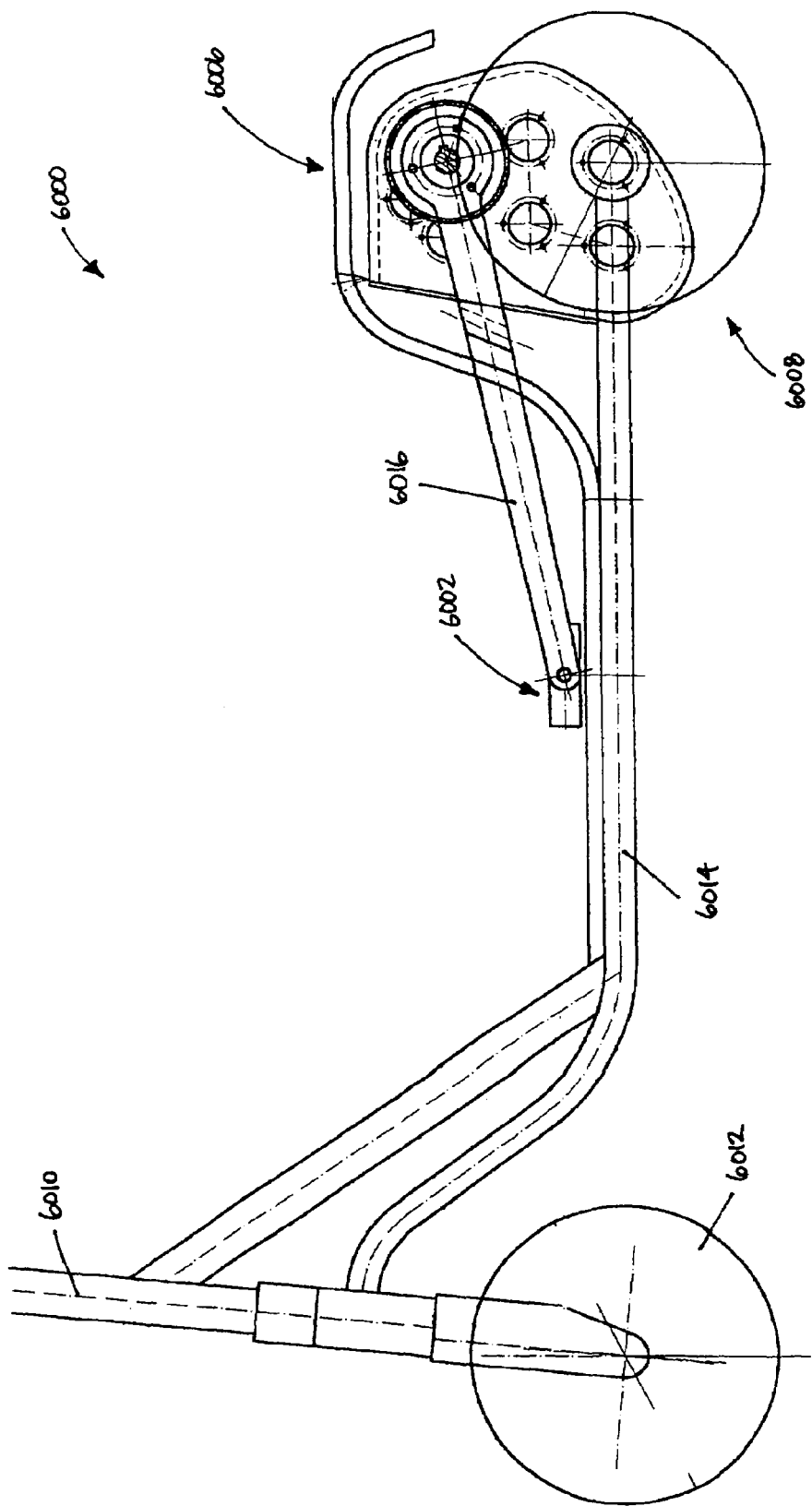
FIG. 5 is a second embodiment of an apparatus in accordance with the invention.
Figure 6:
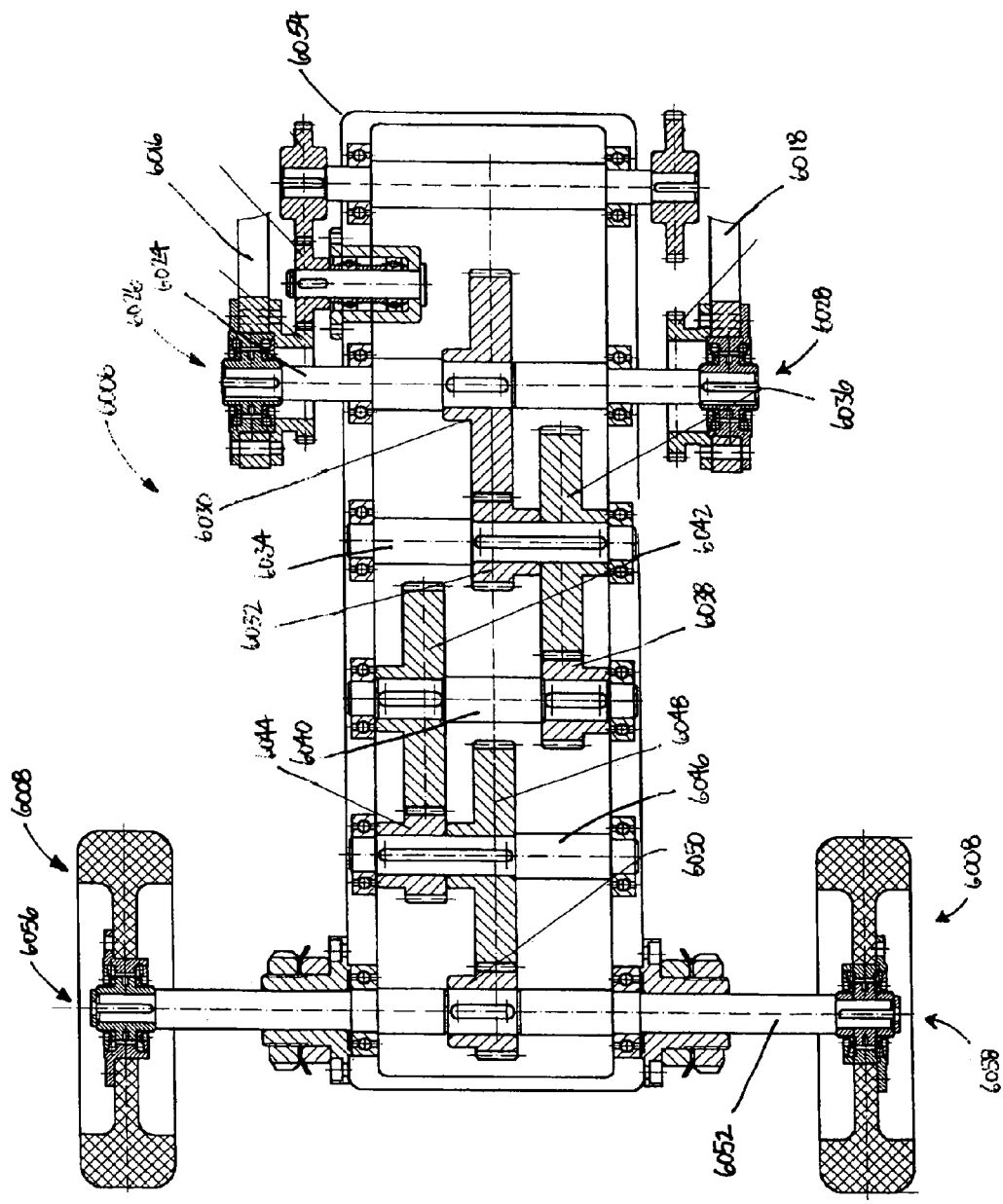
FIG. 6 is an overhead sectional view of a transmission assembly for the apparatus shown in FIG. 5.

FIG. 5 is a second embodiment of an apparatus in accordance with the invention. FIG. 5 shows a partial side view of the apparatus. FIG. 6 is an overhead cross-sectional view of a transmission assembly for the apparatus shown in FIG. 5. Note that the view shown in FIG. 6 is a staggered sectional view through multiple planes of the transmission assembly. The apparatus shown is a scooter 6000 that is propelled by driving two pedals 6002, 6004 upward and downward. Each pedal 6002, 6004 is adapted to receive a portion of a user's body weight when each of a user's feet are placed on a respective pedal 6002, 6004. Each pedal 6002, 6004 is also adapted to move between an initial position and a depressed position. The scooter 6000 also includes a geartrain or transmission assembly 6006 oriented towards the rear portion of the scooter 6000 that translates downward force on the pedals 6002, 6004 to a rotational force on a set of wheels 6008. Note that the geartrain shown is by example only, and other configurations and devices can be utilized in accordance with various embodiments of the invention. A geartrain can include, but is not limited to, chain type-drives, band type-drives, hydraulic-type drives, or other gear drives that translate a downward force into a rotational force. The scooter 6000 includes a T-shaped steering handle 6010 which mounts to a front wheel 6012 and a lower frame 6014.

Note that the apparatus shown is similar to and operates in a similar manner as the embodiment described in FIGS. 1-4. The differences are that there are two additional shafts in the transmission assembly 6006 of the embodiment shown, and the transmission assembly 6006 is mounted partially above the frame 6014.

FIG. 7 is a scooter train in accordance with the invention. A scooter train 9000 is a combination of two or more scooters 9002, 9004, 9006, 9008 equipped with connection devices 9010 similar to those shown as 5016a, 5016b, 5016c shown in FIG. 1. The scooter train 9000 can be propelled by one or more users on any of the scooters, preferably by a user on the lead scooter 9002. Depending on the combination of connection devices 9010 used, one or more of the users can control the direction of the scooter train 9000 by steering a respective scooter 9002, 9004, 9006, 9008. In most cases, the lead scooter 9002 can control the direction of the scooter train 9000. Note that the combination of scooters shown is shown by example only, and greater or lesser numbers of scooters can be used in a scooter train 9000.

While the above description contains many specifics, these specifics should not be construed as limitations on the scope of the invention, but merely as exemplifications of the disclosed embodiments. Those skilled in the art will envision many other possible variations that within the scope of the invention as defined by the claims appended hereto.

The invention I claim is:

1. A scooter comprising:
   a frame;
   pedals connected to the frame and adapted to support a user;
   wheels connected to the frame;
   a pedal recovery system comprising a geartrain providing a return force on the pedals;
   a drivetrain coupling at least one driven wheel to the pedals, wherein motion of a first one of the pedals relative to the frame in a first direction causes rotation of the at least one driven wheel to propel the scooter forward, and further causes motion of a second one of the pedals in a second opposite direction; and
   said geartrain providing a return force on the pedals, and further coupling at least one driven wheel to the pedals, wherein said geartrain comprises a first return gear operable with a first one of said pedals and mounted on a first axle, a second return gear operable with said first return gear, a third return gear mounted on a second axle and operable with said second return gear, said second axle being generally parallel to said first axle, such that rotation of said first return gear in a first direction causes rotation of said third return gear in the first direction and rotation of said second return gear in a second direction, a fourth return gear mounted to said second axle and operable with said third return gear such that rotation of said third return gear in the first direction causes rotation of said fourth return gear in the first direction, and a fifth return gear mounted to said first axle and operable with said fourth return gear and a second one of said pedals such that rotation of said fourth return gear in the first direction causes rotation of said fifth return gear in the an opposing direction.

2. The scooter of claim 1, wherein the geartrain comprises at least one overrunning or one-way clutch to allow the first pedal to move in the second opposite direction without causing opposite rotation of the at least one driven wheel.

3. The scooter of claim 1, wherein the geartrain comprises a recovery action device to recover at least one pedal while depressing a first pedal.

4. The scooter of claim 1, wherein a starting point of the first pedal can be adjusted to change the maximum range of motion of the first and second pedals.

5. The scooter of claim 1, further comprising a brake operable with respect to at least one wheel to brake the scooter and a hand bar operable with respect to at least one wheel to steer the scooter.

6. The scooter of claim 1, further comprising:
   an attachment device to connect another scooter with a corresponding attachment device to the scooter.

7. A wheeled vehicle comprising:
   a first pedal operable to cause rotation of at least one driven wheel via a first drive arm and a drivetrain;
   a second pedal operable to cause rotation of said at least one driven wheel via a second drive arm and said drivetrain;
   a pedal recovery system operable with said first pedal and said second pedal to convert motion of said first pedal in a first direction to motion of said second pedal in a second direction,
   wherein said pedal recovery system comprises a left gear operable with said first pedal arm and mounted on a first axle via a first clutch, a right gear operable with said second pedal arm and mounted on said first axle via a second clutch, and a second axle parallel to said first axle and spaced therefrom, said second axle operating to transfer a return force from said first pedal to said second pedal via at least one gear operable with said second axle.

8. The wheeled vehicle of claim 7, further comprising a rider support structure.

9. The wheeled vehicle of claim 7, further comprising at least one of a steering device and a brake.

10. The wheeled vehicle of claim 7, comprising at least three wheels, wherein at least two of said three wheels comprise driven wheels.

11. The wheeled vehicle of claim 7, further comprising an attachment device adapted to engage a corresponding attachment device of another wheeled vehicle.

12. The wheeled vehicle of claim 7, wherein said drivetrain comprises a first drive gear mounted to said first axle.

13. The wheeled vehicle of claim 12, wherein said drivetrain further comprises a rear axle operable with said at least one driven wheel.

14. The wheeled vehicle of claim 13, wherein said at least one driven wheel comprises two driven wheels, said two driven wheels mounted on said rear axle.

15. The wheeled vehicle of claim 7, wherein said at least one driven wheel comprises a clutch.

16. The wheeled vehicle of claim 13, wherein said drivetrain further comprises a second drive gear and a third drive gear mounted on a second drivetrain axle, and a fourth drive gear mounted on said rear axle.

17. A scooter comprising:
a frame;
a front wheel operable with a handle to steer said scooter;
a rear set of wheels mounted on a rear axle;
two pedals operable to propel said scooter;
a transmission assembly operable to translate a downward force on at least one of said two pedals to a rotational force on at least one wheel of said rear set of wheels; and
a pedal recovery system operable with said two pedals to convert motion of a first pedal of said two pedals in a first direction to motion of a second pedal in a second direction,
wherein said pedal recovery system comprises a left gear operable with said first pedal via a first pedal arm and mounted on a first axle via a first clutch, a right gear operable with said second pedal via a second pedal arm and mounted on said first axle via a second clutch, and a second axle parallel to said first axle and spaced therefrom, said second axle operating to transfer a return force from said first pedal to said second pedal.

18. The scooter of claim 17, further comprising a rider support structure.

19. The scooter of claim 17, further comprising a brake.

20. The scooter of claim 17, further comprising an attachment device adapted to engage a corresponding attachment device of another scooter.

21. The scooter of claim 17, wherein said transmission assembly comprises a drive gear mounted to said first axle.

22. The scooter of claim 21, wherein said transmission assembly further comprises a plurality of gears adapted to transmit a drive force from said drive gear to said rear axle.

23. The scooter of claim 17, wherein said each of said rear set of wheels is mounted to said rear axle via a respective clutch.

24. A wheeled vehicle comprising:
a frame having a handle, a front wheel operable with said handle to steer said wheeled vehicle, and a rear set of wheels mounted on a rear axle;
a first pedal operable to cause rotation of at least one driven wheel via a first drive arm and a transmission;
a second pedal operable to cause rotation of said at least one driven wheel via a second drive arm and said transmission; and
a pedal recovery system operable with said first pedal and said second pedal to convert motion of said first pedal in a first direction to motion of said second pedal in a second direction,
wherein said pedal recovery system comprises a first return gear operable with said first pedal arm and mounted on a first axle via a first clutch, a second return gear engaging said first return gear, a third return gear engaging said second return gear and mounted on a second axle, a fourth return gear mounted on said second axle, and a fifth return gear mounted on said first axle engaging said fourth return gear and operable with said second pedal arm via a second clutch.

25. A wheeled vehicle comprising:
a first pedal operable to cause rotation of at least one driven wheel via a first drive arm and a transmission;
a second pedal operable to cause rotation of said at least one driven wheel via a second drive arm and said transmission;
a pedal recovery system operable with said first pedal and said second pedal to convert motion of said first pedal in a first direction to motion of said second pedal in a second direction,
wherein said pedal recovery system comprises a left gear operable with said first pedal arm and mounted on a first axle via a first clutch, a right gear operable with said second pedal arm and mounted on said first axle via a second clutch, and a second axle parallel to said first axle and spaced therefrom, said second axle operating to transfer a return force from said first pedal to said second pedal, and
wherein said transmission comprises a first drive gear mounted to said first axle and a rear axle operable with said at least one driven wheel.

* * * * *